United States Patent Office 3,367,958
Patented Feb. 6, 1968

3,367,958
STABILIZED POLYCARBONATES
Robert K. Kirkendall, Pittsburgh, Pa., assignor to Mobay Chemical Company, Pittsburgh, Pa., a corporation of Delaware
No Drawing. Continuation-in-part of application Ser. No. 216,323, Aug. 13, 1962. This application Aug. 28, 1964, Ser. No. 392,907
4 Claims. (Cl. 260—45.8)

ABSTRACT OF THE DISCLOSURE

Polycarbonate polymers stabilized against the degradative effects of ultraviolet radiation with a maximum of about 0.5 percent by weight of 2-(2'-hydroxy-5'-methylphenyl)benzotriazole.

This invention relates generally to polycarbonates and more particularly to the stabilization of polycarbonates against ultra-violet radiation and is a continuation-in-part of co-pending application Ser. No. 216,323, filed Aug. 13, 1962, now abandoned.

Polycarbonates are prepared by many well known methods from the reaction or organic dihydroxy compounds and phosgene and/or chlorocarbonic acid esters of organic dihydroxy compounds. For example, dihydroxy aryl alkanes, dihydroxy aryl sulphones, dihydroxy aryl sulphoxides, dihydroxy aryl sulphites, dihydroxy aryl ethers, or other aromatic dihydroxy compounds or mixtures of such have been reacted with phosgene or diesters of carbonic acid to produce linear thermoplastic polycarbonates. Polycarbonates are obtained in powdered or granular form and as such can be formed into films, and molded shaped articles by well known extrusion or injection molding processes. The use of the polycarbonates has been severely limited heretofore particularly in the areas wherein the polycarbonate material is being subjected to outdoor weathering including ultraviolet light radiation and to the ultra-violet radiation provided from artificial sources. The ultra-violet radiation has heretofore resulted in a severe discoloration of the product exposed thereto. This discoloration, yellow in color, is undesirable in most applications wherein polycarbonates are used such as, for molded shaped articles, films, filaments, coatings and the like.

It is, therefore, an object of this invention to provide a polycarbonate that is stabilized against the degradative effects of ultra-violet radiation emanating from artificial and natural sources. It is a further object of this invention to provide a process for stabilizing polycarbonates against the degradative effects of radiation from natural sunlight, and from artificial sources of light. A still further object of this invention is to provide a polycarbonate that is stable against degradation from ultra-violet radiation while simultaneously providing a polycarbonate having the characteristic physical properties of polycarbonates.

The foregoing objects and others are accomplished in accordance with this invention, generally speaking, by providing a method for making polycarbonate plastics stabilized against the degradation effects of ultra-violet radiation by a small amount of the compound 2-(2'-hydroxy-5'-methylphenyl)-benzotriazole.

The amount of the benzotriazole compound will vary depending upon the polycarbonate that is used. However, it has been found that the amount of benzotriazole compound should be no greater than about 0.5% by weight of polycarbonate material. An amount of about 0.001% to 0.5% by weight is preferred. Amounts within this range are extremely effective in retarding color formations in polycarbonate caused by ultra-violet radiation. More than about 0.5% by weight of the benzotriazole compound, based on the weight of the polycarbonate cannot be used because this amount of benzotriazole compound added to the polycarbonate creates solubility problems during thermal processing, the vaporized compound will then tend to deposit on injection molds and thereby temporarily ruin the surface finish. Additionally, when greater than about 0.5% by weight is used, the resultant polycarbonate product exhibits a drastic reduction in impact strength.

The benzotriazole compound may be added to the polycarbonate in a number of different methods. For example, powdered or granular polycarbonates may be mixed with the benzotriazole compound; after which the mixture can be molded or extruded into a desired shaped article. Additionally, the benzotriazole compound may be added to solutions of polycarbonates and to the molten polycarbonate during thermal processing. It is also possible to add the benzotriazole compound to the polycarbonate reaction mixture before or during the preparation of the polycarbonate.

A preferred method of mixing the benzotriazole compound of this invention with the polycarbonate plastic is to carry out the mixing by intimately blending the two components, polycarbonate and 2-(2'-hydroxy-5'-methylphenyl)benzotriazole. This blending can be accomplished by any suitable blending apparatus. The blend can then be extruded in a standard extruder and the resulting strand produced continuously in the form of pellets of polycarbonate plastic containing the stabilizer.

Since all polycarbonate plastics, regardless of the compounds from which they are formed or the process used in forming them, are susceptible to discoloration from ultraviolet light radiation, the novel method and additive of this invention may be employed with all polycarbonate compositions which are prepared utilizing any of the commonly known methods for the production of polycarbonate resins. The polycarbonate material, for example, can be produced from a dihydroxy diaryl alkane and phosgene or a diester of a carbonic acid as described in Canadian Patents 578,585; 578,795 (issued June 30, 1959); 594,805 (issued Mar. 22, 1960); and U.S. Patent 3,028,365 (issued Apr. 3, 1962). Other processes for producing polycarbonates which may be used in accordance with this invention are disclosed in U.S. Patents 2,999,846; 2,970,131; 2,991,273; 2,999,835; 3,014,891; and 3,017,424. Preferably, the polycarbonates useful in this invention have a molecular weight of at least about 10,000 and most preferably between 25,000 and 150,000.

In the preferred method of combining a polycarbonate material with 2-(2'-hydroxy-5'-methylphenyl)-benzotriazole, a dry blending operation is used in which the polycarbonate, in the form of granules, and the novel additive are mixed together in a commercial blender or other tumbling apparatus until the additive is coated onto the resin. After blending, the granules can be extruded in a conventional extruder such as on a 1½" MPM extruder and pelletized. Further processing of the pellets, such as by injection molding, will produce a polycarbonate product having excellent resistance to ultra-violet degradation while concurrently having good heat stability, little or no initial color, and no alteration of other normal physical properties of the polycarbonates.

The combining step is not limited to any particular mixer, blender or temperature and pressure range regardless of the method used for combination. For most purposes, the above-described, dry-blending technique is adequate; the purpose of combining is to bring the novel additive into contact with the polycarbonate prior to producing a finished polycarbonate product and this may be accomplished by the techniques described herein.

The following examples describe the process for successfully mixing the novel additive and polycarbonate and the improvements in the properties of the polycarbonates so prepared. The parts designated in these examples are by weight unless otherwise specified.

Example 1

About 685 parts of 2,2(4,4'-dihydroxy diphenyl) propane (Bisphenol A) (3 mols), about 6.5 parts of p-t-butyl phenol, are suspended in about 2640 parts of water, in a well agitated three neck reaction flask. The three neck flask is equipped with a gas addition tube and a drip tube for the addition of liquid. The oxygen is removed from the suspended Bisphenol A slurry by blowing nitrogen through it for a 15 minute period. After the removal of oxygen, about 480 parts of 50% solution of sodium hydroxide are added. The reaction flask is then cooled to 25° C. by the application of external cooling. After the 25° C. temperature has been reached, about 1500 parts of methylene chloride are added to the reactor while agitating. After the methylene chloride addition is completed, the addition of phosgene is started at such a rate that over a 100 minute period, about 356 parts (3.6 mols) phosgene are added while agitation is maintained. Simultaneously with the start of phosgenation, the addition of 50% sodium hydroxide is also commence so that in an 80 minute period, about 192 parts of sodium hydroxide solution are added to the mixture. The temperature during the phosgenation reaction is maintained at 25° C. by the application of external cooling. At the end of the phosgenation, 2 parts of triethylamine are added to the reaction mixture and the mixture is agitated for a period of 20 minutes. The agitation is now stopped and the mixture is allowed to separate into two phases. The lower, heavy phase will contain the polycarbonate in the form of a solution and the top phase will contain water, unreacted sodium hydroxide and sodium chloride. The top phase is decanted and disposed of. The polymer solution is successively washed with 1% sodium hydroxide then with 1% phosphoric acid which is followed with water and washes until the overflow water is essentially free of electrolytes. In this process, after the end of the phosgenation, the reaction mixture is discharged to a heavy duty mixer such as a Baker-Perkins sigma mixer and the 2 parts of triethylamine are added to the reaction mixture in the sigma mixer. After about 30 minutes of agitation in the sigma mixer, the mixture becomes extremely viscous and forms a dough and an aqueous alkaline layer. The aqueous alkaline layer is discharged to the sewer, the dough is repeatedly washed with dilute caustic and dilute phosphoric acid and finally with several changes of distilled water until the overflow water shows essentially no electrolyte as determined by conductivity measurements. At the end of washing, this dough will break up into small particles which can be further processed by any desired method. The film cast from this polycarbonate will have a relative viscosity of about 1.33–1.37 as determined as 0.5 part of polycarbonate in about 100 parts of methylene chloride at 25° C. This product is then divided into a plurality of equal portions.

The resin produced in accordance with the procedure of Example 1 is then separated into several portions. To the separate portions of resin are added 2-(2'-hydroxy-5'-methylphenyl)-benzotriazole in varying parts by weight. After addition of the benzotriazole compound to the polycarbonate resins, each portion is dry blended in a five gallon can by end-over-end tumbling for about 10 minutes. A control portion of polycarbonate resin is retained from the same batch prepared according to Example 1 and to which no benzotriazole compound is added.

The separate blended and control compositions were individually extruded on a 1½" MPM extruder and then pelletized by conventional means. The pellets thus obtained from each portion of blended and control polycarbonate were molded into 2" x ⅛" discs on a one ounce Minijector" injection press.

The thus prepared discs were then subjected to sunlamp exposure, Weather-O-Meter exposure, and outdoor aging.

Table I below indicates the results obtained when several samples of discs were subjected to sunlamp treatment. In this test, the sunlamp used was a General Electric 275 watt R.S. type and was placed 8 inches above the samples which were on a rotating table revolving at 33⅓ r.p.m.

In the following Tables I, II and III, the exposed samples were measured for increase in color. The percent reflectance at 4200 A. was used as a measure of yellowness using a Bausch and Lomb "505" recording spectrophotometer.

TABLE I.—EVALUATION OF ULTRA-VIOLET STABILIZERS IN POLYCARBONATE, SUNLAMP EXPOSURE

[Percent reflectance at 4,200 A.]

| Stabilizer | Exposure in Hours | | | | | | |
|---|---|---|---|---|---|---|---|
| | 0 | 4 | 16 | 64 | 160 | 256 | 492 |
| (A) 0.1% 2-(2'-hydroxy-5'-methylphenyl)-benzotriazole | 52.5 | 52.5 | 52.5 | 47.0 | 45.0 | 42.5 | 32.5 |
| (B) 1.0% 2-(2'-hydroxy-5'-methylphenyl)-benzotraizole | 44.0 | 44.0 | 44.0 | 43.0 | 43.0 | 42.0 | 36.0 |
| (C) 0.3% 2-(2'-hydroxy-5'-methylphenyl)-benzotriazole | 55.5 | 55.5 | 55.5 | 53.0 | 52.0 | 51.0 | 41.5 |
| (D) 0.5% 2-(2'-hydroxy-5'-methylphenyl)-benzotriazole | 53.5 | 53.5 | 53.5 | 51.0 | 49.0 | 49.0 | 40.0 |
| (E) None (Control) | 50.5 | 47.5 | 45.5 | 39.0 | 34.0 | 30.0 | 20.5 |

In Table I, the lower the percent reflectance, the more discolored (yellow) is the sample. This table clearly demonstrates the effectiveness of the mixtures of materials comprising the invention. The control sample increased 10 percent in yellowness after only 15 hours exposure whereas the samples of this invention were exposed for greater than 256 hours before obtaining such an increase in yellowness.

Several discs, identical to those used in Table I were subjected to outdoor exposure at New Martinsville, W. Va., beginning in the month of March. The discs were placed at 45° South. The results of this outdoor exposure are shown in Table II.

TABLE II.—EVALUATION OF ULTRA-VIOLET STABILIZERS IN POLYCARBONATE, OUTDOOR EXPOSURE [1]

[Percent Reflectance at 4,200 A.]

| Stabilizer | Exposure [1] in Months | | | | | |
|---|---|---|---|---|---|---|
| | 0 | 1 | 2 | 3 | 4 | 7 |
| (A) 0.1% 2-(2'-hydroxy-5'-methylphenyl)-benzotriazole | 50.5 | 57.0 | 59.0 | 60.0 | 61.0 | |
| (B) 1.0% 2-(2'-hydroxy-5'-methylphenyl)-benzotriazole | 42.0 | 46.5 | 49.5 | 51.0 | 52.0 | 51.5 |
| (C) 0.3% 2-(2'-hydroxy-5'-methylphenyl)-benzotriazole | 54.5 | 60.5 | 63.0 | 64.0 | 65.0 | 64.0 |
| (D) 0.5% 2-(2'-hydroxy-5'-methylphenyl)-benzotriazole | 53.5 | 59.6 | 62.0 | 62.0 | 63.0 | |
| (E) None (Control) | 51.1 | 52.5 | 49.0 | 45.0 | 42.0 | 38.0 |

[1] Outdoor exposure at New Martinsville, West Virginia, at 45° South.

From the above, it can be seen that the degradative effect of outdoor exposure of the discs prepared in accordance with this invention was not very severe. After four months exposure, there was an 18.5% increase in yellowness of the control sample. The sample with 0.3% additive, for example, decreased in yellowness by 19.5%. The results from these measurements which indicate that the sample actually decreased in yellowness is, in fact, a measure of the brightness of the sample. Upon exposure, the novel samples actually became brighter, thus, using the measuring terms of this example, a decrease in yellowness occurred.

Table III shows the effect of Weather-O-Meter exposure on the identical type discs used throughout these experiments.

TABLE III.—EVALUATION OF ULTRA-VIOLET STABILIZERS IN POLYCARBONATE, WEATHER-O-METER EXPOSURE

[Percent Reflectance at 4,200 A.]

| Stabilizer | Exposure in Hours | | | | |
|---|---|---|---|---|---|
| | 0 | 400 | 780 | 980 | 1,200 |
| (A) 0.1% 2-(2'-hydroxy-5'-hydroxyphenyl)-benzotriazole | 52.0 | 59.0 | 59.0 | 59.5 | 58.0 |
| (B) 1.0% 2-(2'-hydroxy-5'-hydroxyphenyl)-benzotriazole | 43.5 | 48.0 | 49.0 | 48.5 | 48.5 |
| (C) 0.3% 2-(2'-hydroxy-5'hydroxyphenyl)-benzotriazole | 55.5 | 61.5 | 61.5 | 61.5 | 61.5 |
| (D) 0.5% 2-(2'-hydroxy-5'-hydroxyphenyl)-benzotriazole | 55.0 | 57.0 | 58.5 | 59.9 | 59.0 |
| (E) None (Control) | 53.0 | 54.0 | 52.0 | 49.0 | 45.0 |

These results indicate that the control sample had increased in yellowness by 10% whereas the novel polycarbonates became brighter and actually decreased in yellowness.

More severe outdoor exposure tests were carried out in the State of Arizona using an EMMA device (a mirror device which concentrates the sun's rays while following the sun across the horizon. These rays are continually directed upon the exposed samples. One day under this device is equivalent to about 10 days natural outdoor exposure). The results follow in Table IV.

TABLE IV.—EVALUATION OF ULTRA-VIOLET STABILIZERS IN POLYCARBONATE, EMMA EXPOSURE

[Percent Transmission on Reflectance [1]]

| Stabilizer | Exposure in Langleys [2] | | |
|---|---|---|---|
| | 0 | 50,000 | 350,900 |
| (A) 0.1% 2-(2'-hydroxy-5'-hydroxyphenyl)-benzotriazole | 79.0 | 81.3 | 72.5 |
| (B) 1.0% 2-(2'-hydroxy-5'-hydroxyphenyl)-benzotriazole | 76.2 | 78.8 | 78.5 |
| (C) 0.3% 2-(2'-hydroxy-5'-hydroxyphenyl)-benzotriazole | 81.5 | 84.2 | 82.2 |
| (D) 0.5% 2-(2'-hydroxy-5'-hydroxyphenyl)-benzotriazole | 80.0 | 81.0 | 81.0 |
| (E) None (Control) | 78.8 | 80.0 | 52.0 |

[1] Measured with a "Lumitron" Colorimeter utilizing a blue filter.
[2] A Langley is a measure of energy (gm.-cal./cm.$^2$). In Arizona there are about 600 Langleys of energy per day available from natural sun light.

NOTE.—350,900 Langleys are equivalent to about 585 days exposure to natural sun light. 50,000 Langleys are equivalent to about 83 days exposure to natural sun light.

The results indicate the superiority of the additive stabilized polycarbonates of this invention over normal polycarbonates.

In all of the above tables, the effectiveness of 1% by weight of the additive of this invention in mixture with polycarbonates has been demonstrated with regard to color formation resulting from ultra-violet exposure. However, when the disc containing the 1% by weight of additive was measured for impact strength against a polycarbonate disc containing up to about 0.5% by weight, drastic reduction in impact strength occurred as is shown in Table V below.

TABLE V.—EFFECT OF STABILIZER FORMULATIONS ON IMPACT STRENGTH

| Stabilizer | Izod Impact Strength | | |
|---|---|---|---|
| | ¼" | ⅛" | Percent High ⅛" |
| (A) None (Control) | 2.35 | 16.6 | 100 |
| (B) 0.3% 2-(2'-hydroxy-5'-hydroxyphenyl)-benzotriazole | 2.10 | 16.9 | 100 |
| (C) 1.0% 2-(2'-hydroxy-5'-hydroxyphenyl)-benzotriazole | 1.95 | 2.5-17.8 | 90 |

The foregoing has presented a novel composition and method of preparing said composition whereby it is now possible to effectively retard the degradation of polycarbonates which are exposed to weather and ultra-violet radiation from both natural and artificial sources. Polycarbonates are now useful in many applications which are subjected to ultra-violet radiation without great loss of natural polycarbonate color. Measurements indicate that there is no loss in normal physical properties of the polycarbonates prepared in accordance with this invention.

Although the invention has been described in considerable detail in the foregoing, it is to be understood that such detail is solely for the purpose of illustration and that many variations can be made by those skilled in the art without departing from the spirit and scope of the invention except as set forth in the claims.

The compound 2-(2'-hydroxy-5'-methylphenyl)-benzotriazole has the structure:

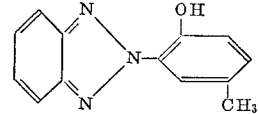

What is claimed is:
1. A polycarbonate composition comprising a polycarbonate having no greater than about 0.5% by weight of the compound 2-(2'-hydroxy-5'-methylphenyl)-benzotriazole.

2. A polycarbonate polymer stabilized against the degradative effects of ultra-violet radiation which comprises a polycarbonate containing from about 0.001 percent to about 0.5 percent by weight of 2-(2'-hydroxy-5'-methylphenyl)-benzotriazole.

3. A polycarbonate polymer stabilized against the degradative effects of ultra-violet radiation which comprises a polyaryl carbonate having a molecular weight of from about 25,000 to about 150,000 and containing a maximum of about 0.5 percent by weight of 2-(2'-hydroxy-5'-methylphenyl)-benzotriazole.

4. A polycarbonate polymer stabilized against the degradative effects of ultra-violet radiation which comprises a polycarbonate polymer having a molecular weight of at least about 10,000 and prepared from 2,2(4,4'-dihydroxy diphenyl)-propane and a member selected from the group consisting of phosgene and carbonic acid, and containing a maximum of about 0.5 percent by weight of 2-(2'-hydroxy-5'-methylphenyl)-benzotriazole.

References Cited

UNITED STATES PATENTS 3,267,113  8/1966  Carboni _____ 260—45.8 X
3,189,615  6/1965  Heller et al. _____ 260—45.8 X DONALD E. CZAJA, Primary Examiner.

LEON J. BERCOVITZ, Examiner.

M. J. WELSH, Assistant Examiner.